Oct. 14, 1969
P. FYFE
3,472,921
METHOD OF MAKING OPTICAL FIBERS
Filed May 20, 1965
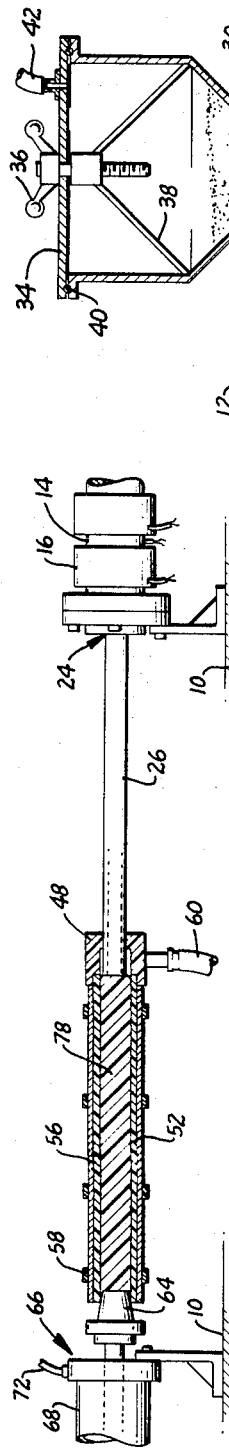
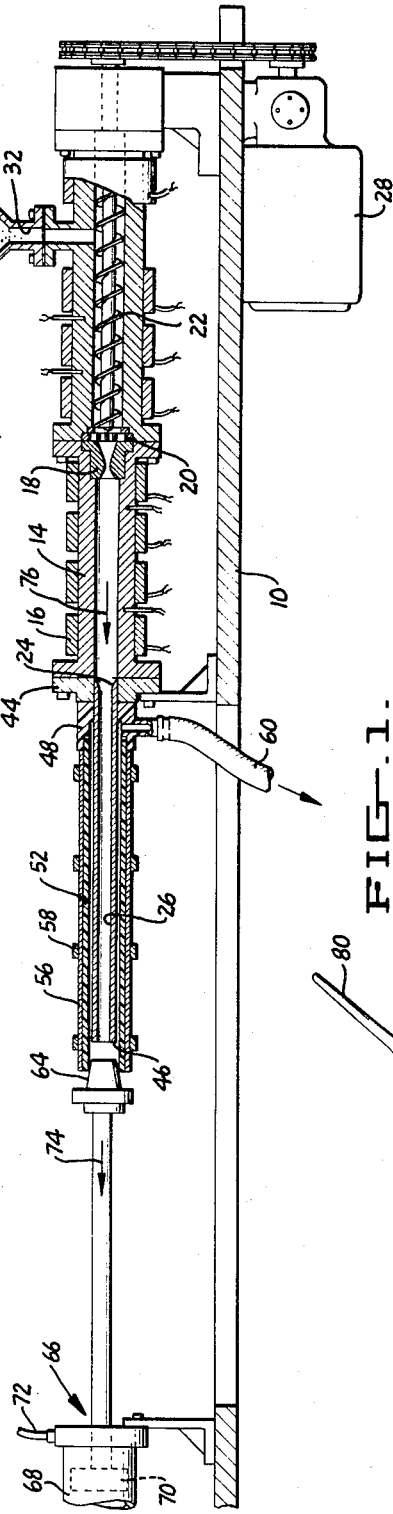
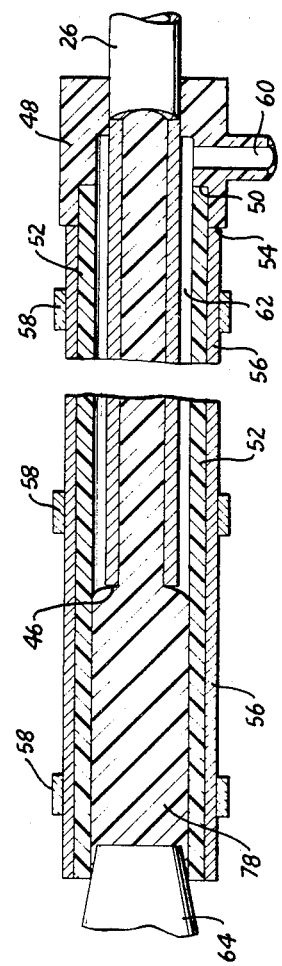
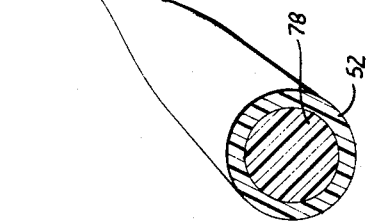
INVENTOR.
PAUL FYFE
BY *Naylor & Neal*
ATTORNEYS

United States Patent Office 3,472,921
Patented Oct. 14, 1969

3,472,921
METHOD OF MAKING OPTICAL FIBERS
Paul Fyfe, Downey, Calif., assignor, by mesne assignments, to Poly-Optics, Inc., a corporation of California
Filed May 20, 1965, Ser. No. 457,407
Int. Cl. B29d *11/00;* G02b *5/14;* B32b *1/08*
U.S. Cl. 264—1                                 12 Claims

ABSTRACT OF THE DISCLOSURE

A method of making optical fibers having a core and surrounding sheath wherein the core and sheath materials are brought into contact under conditions such that each section of core material is continuous with the same section of sheath material at substantially all times subsequent to the contact. In a particular embodiment, the sheath material is provided in the form of an elongated, preformed tubular jacket of first thermoplastic material and thermoplastic core material, having an index of refraction greater than the index of refraction of the first thermoplastic material, is progressively deposited within the jacket from one end thereof to the other.

---

This invention relates to fiber optics and more particularly to a method and apparatus for making optical fibers out of synthetic organic plastic material such as resinous thermoplastics and to the optical fibers thus produced.

Optical fibers made of coated glass have been used for a number of purposes, for instance in the diagnostic instrument shown in Richards Patent 3,091,235 where a plurality of extremely small diameter fibers are bound together in a flexible bundle to transmit images over flexible paths. The glass fibers employed in such fiber bundles have a number of disadvantages inherent in the glass material from which they are made, and particularly the glass fibers are relatively brittle and will break when subjected to excessive flexing or rough handling.

In accordance with this invention, extremely fine optical fibers are produced from organic plastic materials such as resinous thermoplastics having strength and flexibility characteristics which exceed the characteristics of known glass fibers and which additionally have characteristics of light transmission which far exceed the characteristics heretofore obtainable with optical fibers made of organic plastics.

In accordance with this invention, a method of making optical fibers is provided whereby cross talk between fibers of a fiber bundle is substantially reduced, and the internal reflection of each fiber is substantially increased. The method of making the fibers of this invention provide a fine interface between the light transmissive core of the fiber and a coating on the fiber so that local imperfections in the interface are eliminated with accompanying elimination of local areas of light leakage from the fiber.

Additionally, when the materials from which the optical fibers are made are treated in accordance with this invention, very long fibers may be obtained with high light transmission and a minimum of absorption of the light transmitted by the fiber.

Other features and advantages of the invention will become apparent from the following description read in conjunction with the attached drawings in which:

FIG. 1 is a longitudinal sectional view of apparatus of this invention for making large diameter optical fibers;

FIG. 2 is a longitudinal sectional view of the apparatus of FIG. 1 illustrating a different position of the parts in the apparatus;

FIG. 3 is an enlarged sectional view showing a fragment of the apparatus of FIGS. 1 and 2 with the parts illustrated at an intermediate stage in the operation of forming an optical fiber, and FIG. 4 is a perspective view of the optical fiber produced with the apparatus of FIG. 1 where, in FIG. 4, the fiber is illustrated as partially drawn.

Referring now in detail to the drawings and particularly to FIG. 1, the apparatus illustrated therein includes a frame 10 which supports a plastic extruder indicated generally at 12. The extruder includes a tube 14 surrounded by heating coils 16, an extrusion nozzle 18, a breaker plate 20, and an extrusion screw 22 by which fluid plastic is extruded into the right hand end 24 of a tube 26.

A drive motor 28 is provided for turning the extrusion screw, and a hopper 30 communicates through a passageway 32 with the extrusion screw for supplying to the extrusion screw plastic material to be extruded. The hopper 30 is provided with a removable cover 34 which may be secured in place by a screw 36 received in an interior spider 38 in the hopper. An O-ring seal 40 surrounds the periphery of the hopper, and the hopper is provided with fluid conduits 42 for passing an atmosphere of an inner gas such as nitrogen through the entire extrusion apparatus. Except for the provision of means for maintaining an inert atmosphere in the extruder, the extruder operates in a conventional manner to deliver fluid plastic material to the inlet end 24 of the tube 26.

The end 24 of the tube 26 is mounted on a face plate 44 which is bolted onto the end of the extruder, and the tube 26 projects to its outer end 46. A slider block 48 is mounted on the tube 26 for sliding movement from the end 24 to the end 46, and as best seen in FIG. 3, the slider block 48 is provided with a first shoulder 50 which supports one end of a preformed plastic jacket 52 and a second shoulder 54 which receives one end of a rigid metal support tube 56. A plurality of circumferentially extending heating elements 58 are provided on the metal tube 56 for heating the plastic materials on the interior thereof.

The slider block 48 is also provided with an exhaust passageway 60 which communicates with the interior of the slider block in the annular space 62 between the outer surface of the tube 26 and the inner surface of the preformed jacket 52.

A stopper 64 is supported at the outer free end of the metal sleeve 56 for closing the outer end of the plastic jacket 52 which is supported in the sleeve 56. Preferably the stopper is supported on driving means indicated generally at 66 in FIGS. 1 and 2 which is here illustrated as a pneumatic cylinder 68 having an interior piston 70 and a plurality of connecting conduits, one of which is shown at 72, so that fluid delivered to the conduit 72 controls motion of the stopper 64 in the direction indicated by arrow 74.

When the extrusion apparatus of FIG. 1 is to be used for forming an optical fiber, the apparatus is first assembled in the condition illustrated in FIG. 1 with a jacket 52 supported inside the metal sleeve 56 and made out of a plastic material as indicated hereinafter which will form the plastic jacket on the optical fiber.

With the apparatus assembled as illustrated in FIG. 1, the interior plastic material which is to form the core of the optical fiber is extruded from the plastic extruder in the direction indicated by arrow 76 so that the extruded plastic is first deposited in the left hand end of the tube 52. Extrusion of the plastic material is then continued while the slider block 48 and stopper 64 are moved to the left in FIG. 1 as indicated by arrow 74 so that the tube 52 is completely filled in the area adjacent to the free end 46 of the extrusion tube 26 with the extrusion tube 26 progressively withdrawn from the jacket 52 as the filling of the jacket 52 progresses. During the extrusion of the central plastic material into the jacket 52, a vacuum is applied to conduit 60 to exclude gasses from the interior of the tube 52 and to help prevent the formation of bubbles at the interface between the tube 52 and the central core of plastic material.

An intermediate stage in the filling of the plastic tube 52 is illustrated in FIG. 3 where a body of the central plastic material 78 fills the plastic tube between the stopped 64 and the left hand end 46 of the tube 26. Filling of the tube 52 is continued in this manner until the apparatus reaches the condition illustrated in FIG. 2 where the body of plastic material 78 completely fills the tube 52.

After the optical fiber has been formed by the extrusion apparatus and technique illustrated in FIGS. 1–3, the large diameter fiber is drawn to a substantially extended length by conventional apparatus and techniques, and this drawing of the fiber to an increased length results in a substantial reduction in the diameter of the fiber as indicated in the area 80 of the fiber in FIG. 4 with the thicknesses of the core material 78 and packet 52 being correspondingly reduced during the drawing operation. The formation of optical fibers as illustrated in FIGS. 1–4 provides an excellent interface between the central light conducting portion 78 and the jacket 52 with elimination of substantially all local areas of light leakage from the fiber.

As indicated above, the treatment of the plastic materials 52 and 78 prior to actual formation of the fiber is very important if fibers are to be obtained with excellent light transmission characteristics. Additionally, I have found that the selection of the particular plastics to be employed is extremely important, and the following is a description of the manner in which the plastic material should be selected and prepared to obtain extremely fine plastic fibers.

The light transmissive core 78 is formed of polystyrene and preferably the particular polystyrene sold by the Dow Chemical Company under the trade designation Styron 683 which has a yield strength of 7,500, a modulus of elasticity of 500,000, a hardness of 72 Rockwell M, a specific gravity of 1.04, a deflection temperature of 210° F., a melt viscosity of 2,700 poises, and an index refraction of 1.60. Preferably the jacket material 58 is formed of a polymethyl methacrylate sold by Rohm & Haas, under the designation V–100, having a tensile strength of 7,000–11,000, Rockwell hardness of M85–M105, specific gravity 1.17–1.20, deflection temperature 160–195° F. and refractive index of 1.49.

In order to obtain maximum light transmission through these two plastics, the plastics are treated prior to formation of the optical fibers in the following way. Both of the plastics are placed in a vacuum chamber and stored under a vacuum of less than one millimeter of mercury for at least about four hours, and preferably the plastics are stored under a vacuum of approximately 1 micron for twenty-four hours at ambient temperature followed by four hours at 150° F.

Thereafter the tubing 52 is placed in the metal jacket 56, and the polystyrene is placed in the hopper 30 of the extruder with the hopper being sealed and flushed with nitrogen as quickly as possible to prevent oxidative degradation of the polystyrene. The extrusion operation illustrated in FIGS. 1–3 is then performed to fill the tube 52 with the styrene 78, and thereafter the styrene is permitted to cool to a solid condition and the filled plastic tubes are replaced in the vacuum chamber until ready for the drawing operation.

While one specific embodiment of this invention has been illustrated and described in detail herein, it is obvious that many modifications thereof may be made without departing from the spirit and scope of the invention.

I claim:
1. The method of making optical fibers of resinous thermoplastic material which comprises:
 (A) providing and extrusion tube having first and second ends,
 (B) placing around said tube an elongated, preformed tubular jacket made of first resinous thermoplastic material capable of being drawn,
 (C) maintaining a partial vacuum in said tubular jacket by withdrawing gas from the interior of said tubular jacket at a location adjacent to said second end of said tube,
 (D) extruding second resinous thermoplastic material, capable of being drawn and having an index of refraction greater than that of said first resinous thermoplastic material, through said extrusion tube and out of said first end thereof while moving said tubular jacket in the same direction as the direction of flow of said second resinous thermoplastic material and at a rate whereby the jacket cross section is completely filled with said second resinous thermoplastic material, and
 (E) thereafter drawing said jacket filled with said second resinous thermoplastic material to an increased length.

2. The method of making optical fibers of resinous thermoplastic material which comprises:
 (A) providing and extrusion tube having first and second ends,
 (B) placing around said tube an elongated, preformed tubular jacket made of first resinous thermoplastic material capable of being drawn,
 (C) extruding second resinous thermoplastic material, capable of being withdrawn and having an index of refraction greater than that of said first resinous thermoplastic material, through said extrusion tube and out of said first end thereof while moving said tubular jacket in the same direction as the direction of flow of said second resinous thermoplastic material and at a rate whereby the jacket cross section is completely filled with said second resinous thermoplastic material, and
 (E) thereafter drawing said jacket filled with said second resinous thermoplastic material to an increased length.

3. The method of making optical fibers of resinous thermoplastic material which comprises:
 (A) providing and extrusion tube having first and second ends,
 (B) placing around said tube an elongated, preformed tubular jacket made of first resinous thermoplastic material capable of being drawn,
 (C) extruding second resinous thermoplastic material, capable of being drawn and having an index of refraction greater than that of said first resinous thermoplastic material, through said extrusion tube and out of said first end thereof while effecting relative lengthwise movement between said extrusion tube and said tubular jacket wherein said tubular jacket has said relative movement in the direction of relative movement of said second resinous thermoplastic material with respect to said first extrusion tube end and at a rate whereby the jacket cross section is completely filled with said second resinous thermoplastic material, and
 (D) thereafter drawing said jacket filled with said second resinous thermoplastic material to an increased length.

4. The method of making optical fibers of resinous thermoplastic material which comprises:
 (A) providing and extrusion tube having first and second ends,
 (B) placing around said tube an elongated, preformed tubular jacket made of first resinous thermoplastic material capable of being drawn,
 (C) extruding second resinous thermoplastic material, capable of being drawn and having an index of refraction greater than that of said first resinous thermoplastic material, through said extrusion tube and out of said first end thereof while effecting relative lengthwise movement between said extrusion tube and said tubular jacket but without substantial lengthwise relative movement between said extruded second resinous thermoplastic material and said tubular jacket, at a rate whereby the jacket cross section is completely filled with said second resinous thermoplastic material, and (D) thereafter drawing said jacket filled with said second resinous thermoplastic material to an increased length.

5. The method of making optical fibers of resinous thermoplastic materials which comprises:
   (A) providing an elongated preformed tubular jacket made of first resinous thermoplastic material and capable of being drawn, said tubular jacket having first and second ends,
   (B) providing means at said first end of said tubular jacket for introducing thereat second resinous thermoplastic material in fluid form, said second resinous thermoplastic material having an index of refraction greater than that of said first resinous thermoplastic material and capable of being drawn,
   (C) introducing quantities of said second resinous thermoplastic material in fluid form into said tubular jacket first end while effecting relative lengthwise movement between said means and said tubular jacket wherein said tubular jacket has said relative movement in the direction of relative movement of said second resinous thermoplastic material with respect to said means and at a rate whereby the jacket cross section is completely filled with said second resinous thermoplastic material, and
   (D) thereafter drawing said jacket filled with said second resinous thermoplastic material to an increased length.

6. The method of making optical fibers of resinous thermoplastic materials which comprises:
   (A) providing an elongated preformed tubular jacket made of first resinous thermoplastic material capable of being drawn, said tubular jacket having first and second ends,
   (B) providing means at said first end of said tubular jacket for introducing thereat second resinous thermoplastic material in fluid form, said second resinous thermoplastic material having an index of refraction greater than that of said first resinous thermoplastic material and capable of being drawn,
   (C) introducing quantities of said second resinous thermoplastic material in fluid form into said tubular jacket first end while effecting relative lengthwise movement between said means and said tubular jacket but without substantial lengthwise relative movement between said second resinous thermoplastic material and said tubular jacket, at a rate whereby the jacket cross section is completely filled with said second resinous thermoplastic material, and
   (D) thereafter drawing said jacket filled with said second resinous thermoplastic material to an increased length.

7. The method of making optical fibers of resinous thermoplastic materials which comprises:
   (A) providing an elongated preformed tubular jacket made of first resinous thermoplastic material capable of being drawn, said tubular jacket having first and seconds ends,
   (B) providing means at said first end of said tubular jacket for introducing thereat second resinous thermoplastic material in fluid form, said second resinous thermoplastic material having an index of refraction greater than that of said first resinous thermoplastic material and capable of being drawn,
   (C) introducing quantities of said second resinous thermoplastic material in fluid form into said tubular jacket first end while effecting relative lengthwise movement between said means and said tubular jacket to thereby introduce further quantities of said second resinous thermoplastic material progressively in contact with said tubular jacket toward said second end thereof, at a rate whereby the jacket cross section is completely filled with said second resinous thermoplastic material, and
   (D) thereafter drawing said jacket filled with said second resinous thermoplastic material to an increased length.

8. The method of making optical fibers of resinous thermoplastic materials which comprises:
   (A) providing an elongated preformed tubular jacket made of first resinous thermoplastic material capable of being drawn, said tubular jacket having first and second ends,
   (B) providing means at said first end of said tubular jacket for introducing thereat second resinous thermoplastic material having an index of refraction greater than that of said first resinous thermoplastic material and capable of being drawn, and
   (C) introducing quantities of said second resinous thermoplastic material in fluid form into said tubular jacket first end while effecting relative lengthwise movement between said means and said tubular jacket wherein said tubular jacket has said relative movement in the direction of relative movement of said second resinous thermoplastic material with respect to said means and at a rate whereby the jacket cross section is completely filled with said second resinous thermoplastic material.

9. The method of making optical fibers of resinous thermoplastic materials which comprises:
   (A) providing an elongated preformed tubular jacket made of first resinous thermoplastic material capable of being drawn, said tubular jacket having first and second ends,
   (B) providing means at said first end of said tubular jacket for introducing thereat second resinous thermoplastic material in fluid form, said second resinous thermoplastic material having an index of refraction greater than that of said first resinous thermoplastic material and capable of being drawn, and
   (C) introducing quantities of said second resinous thermoplastic material in fluid form into said tubular jacket first end while effecting relative lengthwise movement between said means and said tubular jacket but without substantial lengthwise relative movement between second resinous thermoplastic material and said tubular jacket, at a rate whereby the jacket cross section is completely filled with said second resinous thermoplastic material.

10. The method of making optical fibers of resinous thermoplastic materials which comprises:
    (A) providing an elongated preformed tubular jacket made of first resinous thermoplastic material capable of being drawn, said tubular jacket having first and second ends,
    (B) providing means at said first end of said tubular jacket for introducing thereat second resinous thermoplastic material in fluid form, said second resinous thermoplastic material having an index of refraction greater than that of said first resinous thermoplastic material and capable of being drawn, and
    (C) introducing quantities of said second resinous thermoplastic material in fluid form into said tubular jacket first end while effecting relative lengthwise movement between said means and said tubular jacket to thereby introduce further quantities of said second resinous thermoplastic material progressively in contact with said tubular jacket toward said second end thereof, at a rate whereby the jacket cross section is completely filled with said second resinous thermoplastic material.

11. The method of making optical fibers of thermoplastic materials which comprises:
   (A) providing an extrusion tube having first and second ends,
   (B) placing around said tube an elongated preformed tubular jacket made of polymethylmethacrylate and having an index of refraction of about 1.5,
   (C) maintaining a partial vacuum in said tubular jacket by withdrawing gas from the interior of said tubular jacket at a location adjacent to said second end of said tube,
   (D) extruding polystyrene having an index of refraction of about 1.6 and a softening point below the softening point of said polymethylmethacrylate through said extrusion tube and out of said first end thereof while moving said tubular jacket in the same direction as the flow of said polystyrene, and at a rate whereby the jacket cross section is completely filled with polystyrene, and
   (E) thereafter drawing said jacket filled with polystyrene to an increased length.

12. The method of making optical fibers of polystyrene having an index of refraction of about 1.6 coated with a thermoplastic material having an index of refraction below about 1.6 and a softening point above the softening point of the polystyrene which comprises:
   (A) supporting a quantity of said polystyrene in a vacuum chamber at an absolute pressure of less than one millimeter of mercury for a period of at least four hours,
   (B) providing an extrusion tube having first and second ends,
   (C) placing around said tube an elongated tubular jacket made of said thermoplastic material,
   (D) maintaining a partial vacuum in said tubular jacket withdrawing gas from the interior of said tubular jacket at a location adjacent to said second end of said tube,
   (E) heating said polystyrene to extrusion temperature in the absence of free oxygen,
   (F) extruding said heated polystyrene through said extrusion tube and out of said first end thereof while moving said tubular jacket in the same direction as the direction of flow of said polystyrene through said tube, and at a rate whereby the jacket cross section is completely filled with polystyrene, and
   (G) thereafter drawing said jacket filled with polystyrene to an increased length.

References Cited

UNITED STATES PATENTS

| | | |
|---|---|---|
| 873,559 | 12/1907 | Koontz. |
| 2,801,444 | 8/1957 | Lorenian. |
| 2,825,260 | 3/1958 | O'Brien _____ 264—1 |
| 2,931,091 | 4/1960 | Breen _____ 264—171 |
| 2,962,768 | 12/1960 | Scott _____ 264—171 |
| 2,980,957 | 4/1961 | Hicks _____ 264—1 |
| 2,992,517 | 7/1961 | Hicks _____ 49—79 |
| 3,294,504 | 12/1966 | Hicks _____ 350—96 |

FOREIGN PATENTS 256,405   12/1963   Australia.

JULIUS FROME, Primary Examiner

A. H. KOECKERT, Assistant Examiner

U.S. Cl. X.R.

18—30; 264—39, 85, 267, 290; 350—96